Patented Apr. 20, 1943

2,316,949

UNITED STATES PATENT OFFICE 2,316,949

METHOD OF PLASTICIZING SYNTHETIC RUBBER

Benjamin S. Garvey, Akron, Ohio, assignor to The B. F. Goodrich Company, New York, N. Y., a corporation of New York No Drawing. Application March 26, 1940, Serial No. 326,055

15 Claims. (Cl. 260—36)

This invention relates to a method of plasticizing synthetic rubber-like materials of the type prepared by the polymerization of a conjugated butadiene hydrocarbon such as butadiene, isoprene or dimethyl butadiene either alone or in mixtures which contain a preponderance of a conjugated butadiene hydrocarbon and which also may contain other compounds capable of copolymerizing with conjugated butadiene hydrocarbons among which are acrylic nitriles such as acrylonitrile and methacrylonitrile, aryl olefine such as styrene and vinyl naphthalene, acrylic esters such as methyl methacrylate, and other compounds. It is to be understood that throughout the specification the term synthetic rubber is meant to refer only to synthetic rubber-like materials of this type. The synthetic rubbers to which this invention is most applicable are the butadiene copolymers such as the copolymers of butadiene and acrylonitrile, butadiene and styrene and butadiene and methyl methacrylate.

It is well known that synthetic rubbers of this type are generally elastic and vulcanizable and when vulcanized possess unusually valuable properties including high tensile strength and elongation, and resistance to light, heat, oxidation and the swelling action of oils. Unfortunately, however, when in the unvulcanized condition such synthetic rubbers are frequently tough, hard and devoid of tack so that plasticization and processing is accompanied by considerable difficulties. The methods ordinarily used to plasticize natural rubber are not always effective with synthetic rubber as is evidenced by the behavior of synthetic rubber during mastication or milling. While natural rubber readily softens upon mastication either on a hot or a cold mill, these synthetic rubbers are plasticized only slightly by cold mastication and mastication on a hot mill actually has a stiffening or hardening effect.

Since the usefulness in rubber manufacturing of any rubber-like material depends primarily upon the ease with which the material may be processed, this lack of plasticity in synthetic rubber presents an important technical problem which heretofore has not been solved.

An object of the present invention, therefore, is to provide a method of plasticizing synthetic rubber so that processing operations prior to vulcanization are materially facilitated. Another object is to prepare plastic synthetic rubbers which will give improved dispersion of gas black and other pigments thereby enabling the material to be compounded more efficiently. A further object is to provide a class of materials which will have a plasticizing or softening effect on diene copolymers when added in small amounts. Still other objects will be apparent from the description of this invention.

These objects are accomplished in accordance with the present invention by treating the unvulcanized synthetic rubber with small amounts of an aryl mercaptan or thiophenol in such a manner that a marked plasticizing effect on the copolymer is produced. The terms aryl mercaptan and thiophenol are entirely co-extensive in scope and refer to compounds containing an (SH) sulfhydryl radical directly connected to a carbon atom in an aromatic ring. It is seen that these compounds are phenols in which the oxygen atom is replaced by a sulfur atom. They may be represented by the formula RSH in which R represents an aryl radical such as phenyl, tolyl, xylyl, cumyl, xenyl, naphthyl, anthracyl and the like. Among the compounds particularly suitable for the practice of this invention are, accordingly, thiophenol, thiocresols, thioxylenols, thionaphthols, and thioresorcinols.

The method of employing this class of plasticizing agents may be varied considerably to suit the conditions. If the synthetic rubber is prepared in aqueous emulsion, as is frequently the case, the aryl mercaptan may be added as a solution or a dispersion to the latex before it is coagulated. On the other hand, the plasticizer may be worked into the solid synthetic rubber by a preliminary mastication on a mill or in an internal mixer, or the plasticizer may be applied as one of the compounding ingredients in the ordinary processing operations. If, in processing, the synthetic rubber is to be applied from a paste, solution or cement, it is also possible to treat the material with the plasticizer, thereby reducing its viscosity.

The amount of aryl mercaptan to be used to plasticize the synthetic rubber will, of course, depend upon the particular copolymer employed and upon the effect to be produced. In general, however, it may be said that quantities of aryl mercaptan ranging from 1 to 5% by weight on the rubber are to be preferred. This proportion of the aryl mercaptan produces desirable results when applied either to the latex or to the solid material.

The effect produced on the synthetic rubber depends upon the method of applying the aryl mercaptan and upon the treatment following application. For example, it is desirable to allow synthetic latex to which an aryl mercaptan has been added to stand or age for a convenient period of time, usually from 4 to 24 hours, before coagulation in order to obtain a product which is considerably softer and more plastic. Moreover, if an aryl mercaptan is added to a diene copolymer during mastication, the effect produced depends upon the length of time of mastication and upon the operating temperature. Although a substantial increase over the plasticity obtained without a plasticizer is produced by the use of aryl mercaptans at any convenient temperature, the most pronounced plasticizing action is brought about by working at temperatures in excess of 200° F. It has also been found that for a given temperature, the plasticity of the synthetic rubber increases as the milling time up to a certain maximum, after which continued working effects no further plasticization. The optimum conditions to be utilized in any given instance may easily be determined by preliminary test runs or by following the increase in plasticity during mastication by means of plasticity measurements on samples taken at intervals, or by observing the power consumption during the various stages of the mixing process.

The following examples illustrate preferred embodiments of this invention, and also will serve as a guide in determining the optimum conditions to be used in applying the principles of this invention to other examples obviously within its scope.

*Example 1.*—A butadiene acrylonitrile copolymer containing about 75% by weight of butadiene was prepared by polymerizing the mixed co-monomers in a water emulsion. To 100 c. c. of the resulting latex-like emulsion containing about 25% by weight of copolymer, there was added 0.5 g. (about 2%) of thio beta-naphthol. After standing for 18 hrs. the latex was coagulated. Another 100 c. c. of the latex was treated in the same way except that no thio beta-naphthol was added. The copolymer obtained in the first experiment was soft and plastic while the copolymer to which no plasticizer was added was tough and difficult to mill. Gas black was dispersed in the two copolymer samples and the degree of dispersion was determined by the method of Allen & Schoenfeld (Ind. Eng. Chem. 25, 994, 1933). The dispersion of the treated copolymer was found to be 88 as compared to 78 for the control. A measure of the plasticity of the two samples was also made by measuring the length of a sheet extruded from a tightly closed experimental rubber mill. Expressed in cm. g. the values are as follows:

Treated copolymer _____ 5.7
Control _____ 4.5

*Example 2.*—Five hundred gram batches of a butadiene acrylonitrile copolymer were masticated in a small internal Banbury type mixer as follows:

(a) Copolymer alone
(b) 2% thio beta naphthol added
(c) 2% thio cresol added

Mastication was carried out for 15 minutes at 170° F., followed by 15 minutes at 250° F. and 15 minutes at 320° F. Plasticities were determined on the Goodrich plastometer at 30° C. and 100° C. using a ten pound weight on each of the masticated batches after the successive treatments. The plasticities were taken on molded samples 24 hours after removal from the Banbury. The results are shown below.

|  | Plasticity at 30° C. | Plasticity at 100° C. |
|---|---|---|
| (a) Copolymer control masticated: | | |
| 15′ @ 170° F | 5.8 | 13.5 |
| 15′ @ 250° F | 6.3 | 11.8 |
| 15′ @ 320° F | 3.8 | 6.9 |
| (b) 2% thio beta-naphthol: | | |
| 15′ @ 170° F | 7.3 | 26.8 |
| 15′ @ 250° F | 12.9 | 52.5 |
| 15′ @ 320° F | 15.7 | 37.6 |
| (c) 2% thio cresol: | | |
| 15′ @ 170° F | 5.9 | 15.8 |
| 15′ @ 250° F | 10.1 | 34.2 |
| 15′ @ 320° F | 14.8 | 27.2 |

It is to be noted that while the plasticity at 100° C. of the control sample decreases with continued milling as the temperature is raised, the plasticity of the samples containing an aryl mercaptan is substantially increased by continued milling at higher temperatures up to a maximum, after which the plasticity decreases. This effect is more clearly illustrated by the following example.

*Example 3.*—In order to show the effect of temperature and time of mastication on the plasticity of the rubber the following experiments were performed in the same manner as in Example 2. The temperature was held constant and plasticities were determined at 100° C. using the Goodrich plastometer on samples taken after 5, 10, 15, 30 and 45 minutes milling. The results at 250° F. and 320° F. follow:

|  | Milling time (minutes) | | | | |
|---|---|---|---|---|---|
|  | 5 | 10 | 15 | 30 | 45 |
|  | Plasticity at 100° C. | | | | |
| 2% thio cresol @ 250° F | 16.3 | 26.5 | 30.4 | 69.7 | 52.4 |
| 2% thio cresol @ 320° F | 37.8 | 59.2 | 40.9 | 23.7 | 19.5 |
| 2% thio beta naphthol @ 250° F | 16.9 | 36.7 | 29.8 | 16.1 | 10.2 |
| 2% thio beta naphthol @ 320° F | 31.5 | 40.4 | 33.6 | 25.2 | 20.7 |

In every case it can be seen that maximum plasticity at a given temperature is attained after a certain milling time. With thio cresol @ 250° F. maximum plasticity results after 30 minutes milling while at 320° F. maximum plasticity is obtained after only 10 minutes milling.

*Example 4.*—The following table shows the effect of varying the concentration of the aryl mercaptan. It can be seen that little plasticization is brought about at concentrations lower than 1%. Thio cresol was used as the plasticizing agent and mastication was carried out at 320° F. in all cases. The copolymer used was one of butadiene and acrylonitrile.

| Conc. of plasticizer | Milling time (minutes) | | | | |
|---|---|---|---|---|---|
|  | 5 | 10 | 15 | 30 | 45 |
|  | Plasticity at 100° C. | | | | |
| 0.5% | 10.9 | 7.7 | 5.6 | 5.0 | 5.2 |
| 1 | 22.0 | 14.5 | 10.6 | 6.5 | 4.5 |
| 2 | 37.8 | 64.5 | 40.4 | 16.0 | 9.5 |
| 5 | 66.0 | 83.6 | 85.0 | 93.2 | 91.8 |

Original plasticity of copolymer—5.1.

Although this invention has been specifically described with reference to a copolymer of butadiene and acrylonitrile, similar results are obtained when this process is applied to any rubbery polymer prepared by the polymerization of a material consisting predominately of a conjugated butadiene hydrocarbon. For example, copolymers of butadiene and styrene, copolymers of butadiene and methyl methacrylate or polymers of butadiene alone are plasticized in much the same manner when treated with an aryl mercaptan.

It is not intended, therefore, that this invention be limited to any of the particular examples or specific materials described herein, but rather that the invention be construed in accordance with the appended claims.

I claim:

1. A method of increasing the plasticity of a rubbery polymer prepared by the polymerization of a material consisting predominately of a conjugated butadiene hydrocarbon, which comprises treating said rubbery polymer with an aryl mercaptan.

2. A method of increasing the plasticity of a rubbery polymer prepared by the polymerization of a material consisting predominately of a conjugated butadiene hydrocarbon, which comprises masticating said rubbery polymer in the presence of a small amount of an aryl mercaptan.

3. A method of increasing the plasticity of a rubbery polymer prepared by the polymerization of a material consisting predominately of conjugated butadiene which comprises treating said rubbery polymer with from 1 to 5% by weight of an aryl mercaptan.

4. A method of increasing the plasticity of a rubbery polymer prepared by the polymerization of a material consisting predominately of butadiene which comprises treating a polymerized latex containing said rubbery polymer with from 1 to 5% by weight of an aryl mercaptan, allowing said latex to age for a sufficient length of time to exert a marked plasticizing effect upon said rubbery polymer, and thereafter separating said rubbery polymer from the latex.

5. A method of increasing the plasticity of a rubbery polymer prepared by the polymerization of a material consisting predominately of butadiene which comprises masticating said rubbery polymer with from 1 to 5% by weight of an aryl mercaptan at a high temperature, substantially above 200° F.

6. A method of increasing the plasticity of a rubbery polymer prepared by the polymerization of a material consisting predominately of butadiene which comprises masticating said rubbery polymer in the presence of from 1 to 5% by weight of an aryl mercaptan for a time not substantially in excess of that during which the plasticity of the polymer continues to increase.

7. A method of increasing the plasticity of a rubbery butadiene copolymer which comprises treating said copolymer with from 1 to 5% by weight of thio-beta-naphthol.

8. A method of increasing the plasticity of a rubbery butadiene copolymer which comprises treating a latex containing said copolymer with from 1 to 5% by weight of thio-beta-naphthol.

9. A method of increasing the plasticity of a rubbery butadiene acrylonitrile copolymer which comprises masticating said copolymer in the presence of 1 to 5% by weight of thio-beta-naphthol.

10. A method of increasing the plasticity of a rubbery butadiene acrylonitrile copolymer which comprises masticating said copolymer in the presence of 1 to 5% by weight of thio-beta-naphthol at a temperature substantially above 200° F. for a time not substantially in excess of that during which the plasticity of the copolymer continues to increase.

11. A method of increasing the plasticity of a rubbery butadiene acrylonitrile copolymer which comprises masticating said copolymer in the presence of 1 to 5% by weight of thio cresol.

12. A method of increasing the plasticity of a rubbery butadiene acrylonitrile copolymer which comprises masticating said copolymer in the presence of 1 to 5% by weight of thio cresol at a temperature substantially above 200° F. for a time not substantially in excess of that during which the plasticity of the copolymer continues to increase.

13. A composition of matter comprising an aryl mercaptan and a rubbery polymer prepared by the polymerization of a material consisting predominately of a conjugated butadiene hydrocarbon.

14. A composition of matter comprising a rubbery butadiene acrylonitrile copolymer and from 1 to 5% by weight of thio-beta-naphthol.

15. A composition of matter comprising a rubbery butadiene acrylonitrile copolymer and from 1 to 5% by weight of thio-cresol.

BENJAMIN S. GARVEY.